(12) United States Patent
Chen

(10) Patent No.: US 9,947,108 B1
(45) Date of Patent: Apr. 17, 2018

(54) METHOD AND SYSTEM FOR AUTOMATIC DETECTION AND TRACKING OF MOVING OBJECTS IN PANORAMIC VIDEO

(71) Applicant: Scott Zhihao Chen, Irvine, CA (US)

(72) Inventor: Scott Zhihao Chen, Irvine, CA (US)

(*) Notice: Subject to any disclaimer, the term of this patent is extended or adjusted under 35 U.S.C. 154(b) by 52 days.

(21) Appl. No.: 15/149,653

(22) Filed: May 9, 2016

(51) Int. Cl.
*G06K 9/00* (2006.01)
*G06T 7/20* (2017.01)
*H04N 5/232* (2006.01)
*G06T 3/40* (2006.01)

(52) U.S. Cl.
CPC .......... *G06T 7/2093* (2013.01); *G06T 3/4038* (2013.01); *G06T 7/2006* (2013.01); *G06T 7/2046* (2013.01); *H04N 5/23238* (2013.01); *G06T 2207/20144* (2013.01)

(58) Field of Classification Search
CPC ... G06T 7/2093; G06T 3/4038; G06T 7/2006; G06T 7/2046; G06T 2207/20144; H04N 5/23238
See application file for complete search history.

(56) References Cited

U.S. PATENT DOCUMENTS

| | | | | |
|---|---|---|---|---|
| 5,187,754 A | * | 2/1993 | Currin | G06K 9/0063 375/E7.086 |
| 8,213,737 B2 | * | 7/2012 | Steinberg | G06K 9/00248 382/254 |
| 9,620,168 B1 | * | 4/2017 | Townsend | G11B 27/02 |
| 2007/0237422 A1 | * | 10/2007 | Zhou | G06K 9/00624 382/284 |
| 2016/0063705 A1 | * | 3/2016 | Xu | G06T 5/50 382/199 |

\* cited by examiner

*Primary Examiner* — Yon Couso

(57) ABSTRACT

Panoramic imaging systems and techniques are disclosed. In one aspect, a technique for automatic detecting and tracking of a foreground object includes the steps of: receiving a first set of raw images in an image sequence captured by a panoramic imaging system; stitching, by the panoramic imaging system, the first set of raw images to generate a panoramic image; detecting, by the panoramic imaging system, a foreground object in the panoramic image; tracking, by the panoramic imaging system, a movement of the foreground object in the image sequence; and generating, by the panoramic imaging system, a panoramic video based on the image sequence with tracking the movement of the foreground object.

11 Claims, 7 Drawing Sheets

METHOD AND SYSTEM FOR AUTOMATIC DETECTION AND TRACKING OF MOVING OBJECTS IN PANORAMIC VIDEO

The present disclosure generally relates to the field of panoramic imaging, and more specifically to systems and techniques for automatic detection and tracking of moving objects in a panoramic video stream and/or an image sequence.

BACKGROUND

Panoramic photography, the taking of a photograph or photographs covering an elongated field of view, has a long history in photography. Perhaps the most primitive method of panoramic photography is the taking of several adjoining photos with a conventional camera and then mounting the prints together in alignment to achieve a complete panorama. Modern techniques adapt this method by using digital cameras to capture the images, and then using computer image processing techniques to align the images for printing as a single panorama.

The continuous development of digital camera technologies along with constantly increasing speed and processing power of computers have laid the foundation for digital imaging systems that are capable of acquiring image data for the automatic creation of wide to entire 360° panoramas, including both still panoramic images and dynamic panoramic movies.

Detection and tracking of moving objects are critical in the area of computer vision. Detection and tracking of moving objects in a video stream may often require complex image processing, pattern recognition, artificial intelligence, and/or adaptive control, especially in in a panoramic video stream and/or an image sequence. The main challenge of detection and tracking of moving objects lies in the processing and understanding of images with complicated background context.

Different techniques related to detection and tracking of moving objects are widely used in military visual guidance, robot navigation, safety surveillance, traffic control, medical diagnosis, virtual reality and battlefield vigilance, public-safety monitoring, man-machine interaction, and/or image compression. Among all techniques of detection and tracking of moving objects, color histogram is extensively adopted due to many advantages including feature stability, anti-occlusion, methodology simplicity and moderate computational complexity. The main drawback, however, is the low tracking robustness resulted from its vulnerability to illumination, vision and camera settings, as well as from the background interference.

SUMMARY

The disclosed subject matter relates to a method of automatic detecting and tracking of a foreground object. The method comprises receiving a first set of raw images in an image sequence captured by a panoramic imaging system. The method further comprises stitching, by the panoramic imaging system, the first set of raw images to generate a panoramic image. The method further comprises detecting, by the panoramic imaging system, a foreground object in the panoramic image. The method further comprises tracking, by the panoramic imaging system, a movement of the foreground object in the image sequence. In addition, the method comprises generating, by the panoramic imaging system, a panoramic video based on the image sequence with tracking the movement of the foreground object.

The disclosed subject matter also relates to a panoramic imaging system. The panoramic imaging system comprises a plurality of cameras having a field of view that overlaps with the field of view of at least one other camera among the plurality of cameras. The panoramic imaging system comprises a controller commanding a first camera and a second camera among the plurality of cameras to acquire a first image and a second image, respectively. The panoramic imaging system comprises a processor to perform operations comprising receiving the first image and the second image in an image sequence. The operations further comprise stitching the first image and the second image to generate a panoramic image. The operations further comprise detecting a foreground object in the panoramic image. The operations further comprise tracking a movement of the foreground object in the image sequence. In addition, the operations comprise generating a panoramic video based on the image sequence with tracking the movement of the foreground object.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

A combined-feature model, incorporating information of both greyscale and gradient, may enhance tracking robustness of moving objects. The combined-feature model may efficiently work around the problems such as occlusion, undistinguished object-background greyscale. However, the combined-feature model may fail in the circumstances where similarity lies in between both greyscale and gradient features of different objects and/or between objects and background.

The present disclosure of automatic detection and tracking of moving objects may implement a mean-shift algorithm based on combined features, such as a histogram model of greyscale, gradient and color. This combined-feature detection method, coupled with mean-shift tracking, may enhance the accuracy and robustness of tracking of moving objects in the circumstances of complicated background context, and/or high similarity between object and background in color, greyscale and gradient features.

Figure 1:
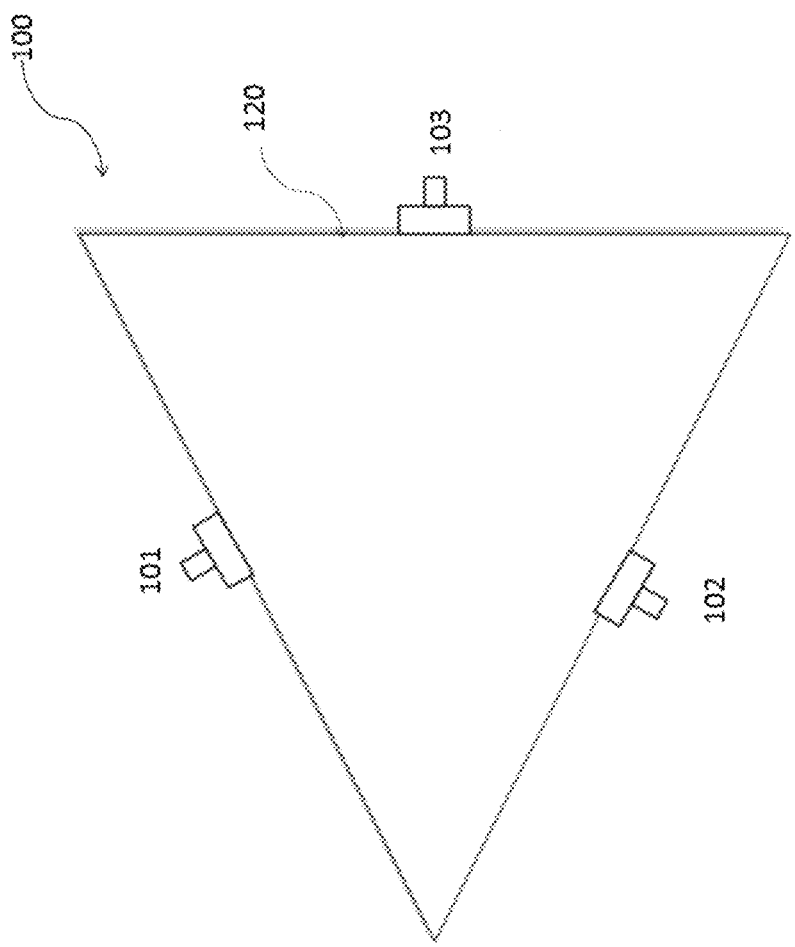
FIG. 1 is a schematic top view of an example panoramic imaging system according to certain aspects of the disclosure.

FIG. 1 is a schematic top view of an example panoramic imaging system 100 according to certain aspects of the disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

The example panoramic imaging system 100 of FIG. 1 includes cameras 101, 102 and 103, and one or more FPGA, APU and peripheral chips. In some aspects, each of cameras 101, 102 and 103 may include a fisheye lens to capture 360-degree panoramic image data. The horizontal angle of view of a fisheye lens may be greater than 180 degrees and the vertical angle of view of a fisheye lens greater than 180 degrees. In some aspects, the number of cameras in the example panoramic imaging system 100 of FIG. 1 is not limited to three as shown in FIG. 1, and the number of cameras may be two, four, five or any number.

In some aspects, the example panoramic imaging system 100 of FIG. 1 may include a handheld device with 360-degree panorama real-time recording and broadcasting capabilities. The example panoramic imaging system 100 of FIG. 1 may be used to capture horizontal 360-degree panoramic image data within a front, rear, left and right direction of the example panoramic imaging system 100 of FIG. 1 and achieve real-time broadcasting and sharing of the image data. The example panoramic imaging system 100 of FIG. 1 may generate 360-degree panoramic image data by imaging stitching and construction, and send to a cloud device or an electronic device via a wireless communication method, and/or store the encoded image data locally on the example panoramic imaging system 100 of FIG. 1, for example, on a Secure Digital (SD) Card.

In some aspects, the example panoramic imaging system 100 of FIG. 1 may send the generated 360-degree panoramic image data to an electronic device, for example, including a smartphone, for live broadcast via a wireless communication method. In some aspects, the example panoramic imaging system 100 of FIG. 1 may send the generated 360-degree panoramic image data to the cloud via a wireless router to achieve cloud data storage and sharing. 360-degree panoramic image data in the cloud can be broadcast in smart devices and/or a web end device. In some aspects, the example panoramic imaging system 100 of FIG. 1 may send the 360-degree panoramic image data to a computer for storage and playback via Universal Serial Bus (USB) 3.0 standard. In some aspects, the example panoramic imaging system 100 of FIG. 1 may send the 360-degree panoramic image data to a smart device for playback via a High-Definition Multimedia Interface (HDMI). In some aspects, the example panoramic imaging system 100 of FIG. 1 may store the encoded 360-degree panoramic image data in a SD Card on the example panoramic imaging system 100 of FIG. 1.

Figure 2:
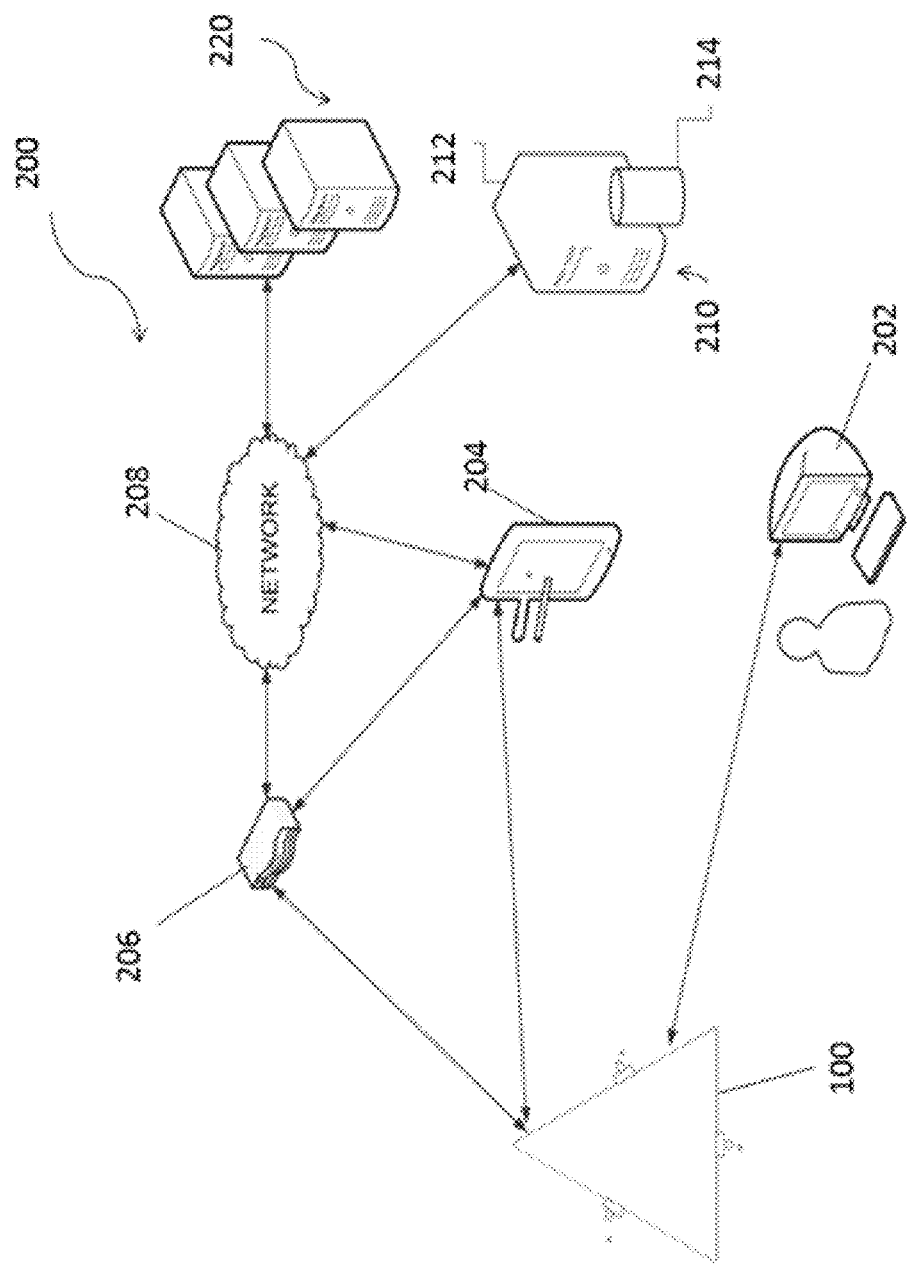
FIG. 2 illustrates an example network environment which provides for capturing and processing panoramic photographs and videos.

FIG. 2 illustrates an example network environment which provides for capturing and processing panoramic photographs and videos. Not all of the depicted components may be used, however, and one or more implementations may include additional components not shown in the figure. Variations in the arrangement and type of the components may be made without departing from the scope of the subject technology. Additional components, different components, or fewer components may be provided.

Network environment 200 includes panoramic imaging system 100, computing devices 202 and 204 communicably connected to servers 210 and 220 via network 208. Computing devices 202 and 204 may access network 208 via wireless access point 206.

Each of computing devices 202 and 204 can represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 202 and 204 may be provided access to or receive application software executed or stored on any of other computing devices 202 and 204.

Server 210 can include computing device 212 and computer-readable storage device 214 (e.g., data stores). Each of servers 210 and 220 may be a system or device having a processor, a memory, and communications capability for providing content and/or services to the computing devices. In some example aspects, each of servers 210 and 220 can be a single computing device, for example, a computer server. In other embodiments, each of servers 210 and 220 can represent more than one computing device working together to perform the actions of a server computer (e.g., cloud computing). Further, each of servers 210 and 220 can represent various forms of servers including, but not limited to an application server, a proxy server, a network server, an authentication server, an electronic messaging server, a content server, a server farm, etc., accessible to computing devices 202 and 204. For example, server 210 may be a web server that delivers web content accessible through network 208.

A user may interact with the content and/or services provided by servers 210 and 220, through a client application installed at computing devices 202 and 204. Alternatively, the user may interact with the system through a web browser application at computing devices 202 and 204. Communication between computing devices 202 and 204 and servers 210 and 220 may be facilitated through network 208.

In some aspects, computing devices 202 and 204 may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

As described above with reference to FIG. 1, panoramic imaging system 100 of FIG. 1 includes cameras 101, 102, and 103, a control system and housing 120. In some aspects, panoramic imaging system 100 may be a handheld device with 360-degree panorama real-time recording and broadcasting capabilities. Panoramic imaging system 100 may be used to capture horizontal 360-degree panoramic image data within a front, rear, left and right direction of panoramic imaging system 100 and achieve real-time broadcasting and sharing of the image data. Panoramic imaging system 100 of may generate 360-degree panoramic image data by imaging stitching and construction, and send to computing devices 202 and 204 via a wireless communication method, and/or store the encoded image data locally on panoramic imaging system 100, for example, on a Secure Digital (SD) Card.

In some aspects, panoramic imaging system 100 may send the generated 360-degree panoramic image data to computing device 204, for example, including a smartphone, for live broadcast via a wireless communication method. In some aspects, panoramic imaging system 100 may send the generated 360-degree panoramic image data to the cloud via wireless access point 206 to achieve cloud data storage and sharing. 360-degree panoramic image data in the cloud can be broadcast in computing device 204, such as smart devices and/or a web end device. In some aspects, panoramic imaging system 100 may send the 360-degree panoramic image data to computing device 202 for storage and playback via Universal Serial Bus (USB) 3.0 standard. In some aspects, panoramic imaging system 100 may send the 360-degree panoramic image data to computing device 202 for playback via a High-Definition Multimedia Interface (HDMI). In some aspects, panoramic imaging system 100 may store the encoded 360-degree panoramic image data in a SD Card on panoramic imaging system 100.

Figure 3:
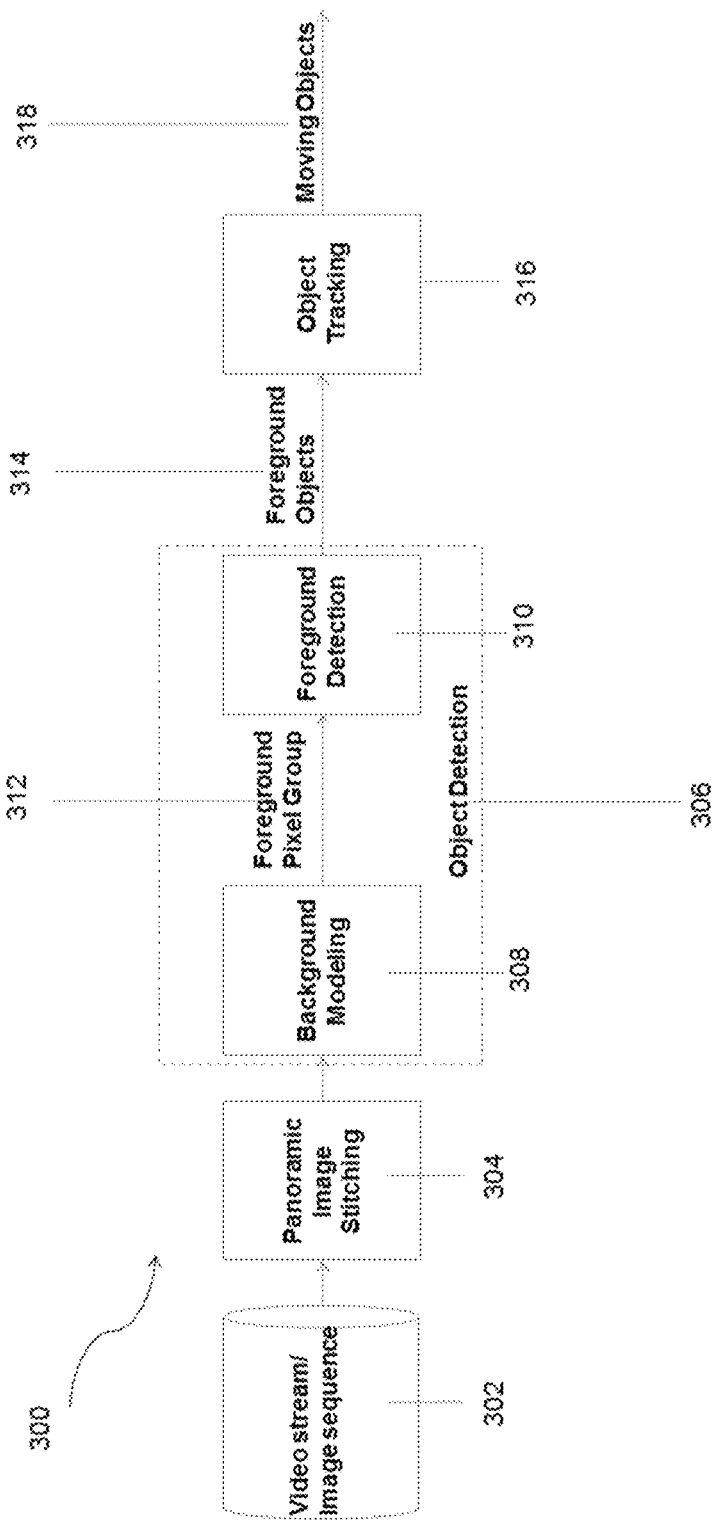
FIG. 3 illustrates a flow diagram of an example process of automatic detection and tracking of moving objects in a panoramic video stream.

FIG. 3 illustrates a flow diagram of an example process 300 for automatic detection and tracking of moving objects in panoramic video stream or image sequence according to one embodiment of the present disclosure. For explanatory purposes, the example process 300 is primarily described herein with reference to panoramic imaging system 100 of FIG. 2; however, the example process 300 is not limited to the panoramic imaging system 100 of FIG. 2, and the example process 300 may be performed by one or more components of network environment 200 of FIG. 2, such as servers 210 and/or 220. Further for explanatory purposes, the blocks of the example process 300 are described herein as occurring in serial, or linearly. However, multiple blocks of the example process 300 may occur in parallel. In addition, the blocks of the example process 300 may be performed a different order than the order shown and/or one or more of the blocks of the example process 300 may not be performed.

At block 302, panoramic imaging system 100 captures video streams or image sequences. In some aspects, the video streams or the image sequences may be captured by any panoramic imaging systems with additional components, different components, or fewer components. In some aspects, images in video streams or image sequences may be captured by all cameras 101, 102 and 103 of the example panoramic imaging system 100. In other aspects, images in video streams or image sequences may be captured by any type and any number of a panoramic-camera assembly that has an overlapping field of view among cameras. The images may be captured by cameras at substantially the same time, or within a predetermined periods of time, such as a minute, a second, or less. The captured video streams or image sequences may include moving objects. In some aspects, the number of moving objects in the video streams or the image sequences may not be limited to one. The number of moving objects in the video streams or image sequences may be two, three, four, five, or any number.

At block 304, panoramic imaging system 100 stitches the images in video streams or image sequences to generate panoramic video streams or panoramic image sequences. The panoramic stitching process may be carried out by a pre-implemented algorithm that analyzes each pair of images having an overlapping field to identify an optimum line that makes the total error introduced by cutting and stitching the pair of image inputs along the line to be the minimum. The panoramic stitching process may further cut and stitch images to generate panoramic video streams or panoramic image sequences.

At block 306, panoramic imaging system 100 detects foreground moving objects and background scene in panoramic image sequences generated at block 304. The foreground moving objects and background scene may be subsequently distinguished in each panoramic image frame. Block 306 includes a background modeling 308 to detect foreground pixel group 312 for subsequent foreground detection 310 to output the detected foreground objects 314.

At block 306, Gaussian mixture model may be used to generate histograms of greyscale gradient and color for the detection and subsequent distinguishing of foreground moving objects and background scene. The Gaussian mixture model may be based on the estimation of the probability density of greyscale gradient and color values of pixels of panoramic image frames. In particular, each pixel can be modeled by a mixture consisting of K different Gaussian function components. For example, a proper number K may be chosen which balances the size of computing memories and the requirement of processing speed. Large K may enhance the robustness of processing, yet may lead to a long processing time. In some aspects, K in the range of 3 to 5 may be sufficient to represent greyscale gradient and color values of pixels of panoramic image frames. In some aspects, K may be 6, 7, or an even larger number. Some of the Gaussian function components contribute most to the greyscale gradient and color values of pixels of forefront moving objects, while other Gaussian function components stand for background scene. The probability density of a greyscale gradient and/or color value $X_t$ of a pixel, $P(X_t)$, may be expressed as:

$$P(X_t) = \sum_{i=1}^{K} \omega_{i,t} \eta \left( X_t, \mu_{i,t}, \sum_{i,t} \right)$$

where $\eta(X_t, \mu_{i,t}, \Sigma_{i,t})$ is the $i^{th}$ Gaussian function component, of which $\mu_{i,t}$ is the mean and $\Sigma_{i,t}$ the covariance matrix. $\omega_{i,t}$ is the weight of the ith Gaussian distribution component at time t with $\Sigma_{i=1}^{k} \omega_{i,t}=1$. The mathematic expression of $\eta(X_t, \mu_{i,t}, \Sigma_{i,t})$ is $$\eta\left(X_t, \mu_{i,t}, \sum_{i,t}\right) = \frac{1}{(2\pi)^{\frac{1}{2}} |\Sigma|^{\frac{1}{2}}} e^{-\frac{1}{2}(X_t-\mu_t)^T \Sigma^{-1}(X_t-\mu_t)}$$

In some aspects, RGB color space, defined by the three chromaticities of red, green, and blue additive primaries, is used to span a color value $X_t$. In other aspects, any color space, including but not limited to normalized RGB, YCrCb, HIS, HSV, and HSL, is used to span a color value $X_t$. In order to reduce computational complexity, the color channels of pixels may be assumed to be independent and therefore share the same covariance: $\Sigma_{i,t} = \sigma_{i,t}^2 I$. Although the assumption of, for example, independent RGB channels, is less realistic, it improves the real-time performance.

At block 316, panoramic imaging system 100 automatically tracks the movement of foreground moving objects 314, which is detected in block 306. In some aspects, panoramic imaging system 100 may implement a mean-shift algorithm to track the movement of foreground moving objects 314 with details described below with reference to FIG. 6. For explanatory purposes, the foreground moving-object tracking in block 316 is primarily described herein with reference to the tracking of positions of moving objects; however, the foreground moving-object tracking in block 316 is not limited to the tracking of positions of moving objects, and the foreground moving object tracking may include the tracking of other characteristics, including but not limited to velocity, acceleration, rotation, orientation and shape of the moving objects.

A Mean-shift algorithm is an efficient approach to tracking objects whose appearance is defined by histograms. In the present disclosure, histograms that are adopted are histograms of combined features instead of a single feature. For explanatory purpose, features that are combined refer to color and greyscale gradient as described herein. However, features that are combined are not limited to color and greyscale gradient. Features that are combined can be any number of features including but not limited to, for example, color, greyscale gradient, intensity, and/or edge.

The mean-shift algorithm to track the movement of foreground moving objects 314 may start from a position of detected foreground objects 314 in the current image frame. The mean-shift algorithm to track the movement of foreground moving objects 314 may then search in the neighborhood of the detected foreground objects in next image frame. A number of candidate target foreground objects may be found. The mean-shift algorithm to track the movement of foreground moving objects 314 may finally determine the best candidate of target foreground object 318 by maximizing a similarity function. A similarity function may take many forms. For explanatory purposes, Bhattacharyya coefficient is described herein as a similarity function. The Bhattacharyya coefficient f(y) may be defined as:

$$f(y) = \sum_{v=1}^{m} \sqrt{\hat{p}_v(y) \hat{q}_v}$$

where y is the center of one of candidate target foreground objects. $\hat{q}_v$ is density probability function of combined greyscale gradient and color features of detected moving foreground objects 214 in current frame. $\hat{p}_v(y)$ is density probability function of combined greyscale gradient and color features of candidate moving foreground objects in next frame. The summation runs over all bins v=1, 2, ..., m, to which the combined-feature space is discretized. The mean-shift algorithm to track the movement of foreground moving objects 314 may determine the center position y of best candidate moving foreground object 318 by minimizing the Bhattacharyya coefficient f(y).

FIGS. 4A-4D illustrate an example 3×3 pixel matrix template to establish gradient values according to certain aspects of the disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

For explanatory purpose, gradient refers to a measure of steepness of greyscale. However, gradient is not limited to a measure of steepness of greyscale. Gradient may be a measure of steepness of any imaging features like intensity. Furthermore, FIGS. 4A-4D may not be limited to a 3×3 pixel matrix template and may include an nxm pixel matrix template, where n and m can be any number.

In some aspects, a 3×3 pixel matrix template may be used to establish greyscale gradient of a pixel in a panoramic image according to certain aspects of the disclosure. Greyscale gradient may be established along direction in the angle of 0°, 45°, 90° and 135° measured from location (i,j) as the center location. I(i,j) is the grayscale value of the pixel at location (i,j) in the panoramic image, where i is the x coordinate value and j is the y coordinate value in the panoramic image.

Figure 4:
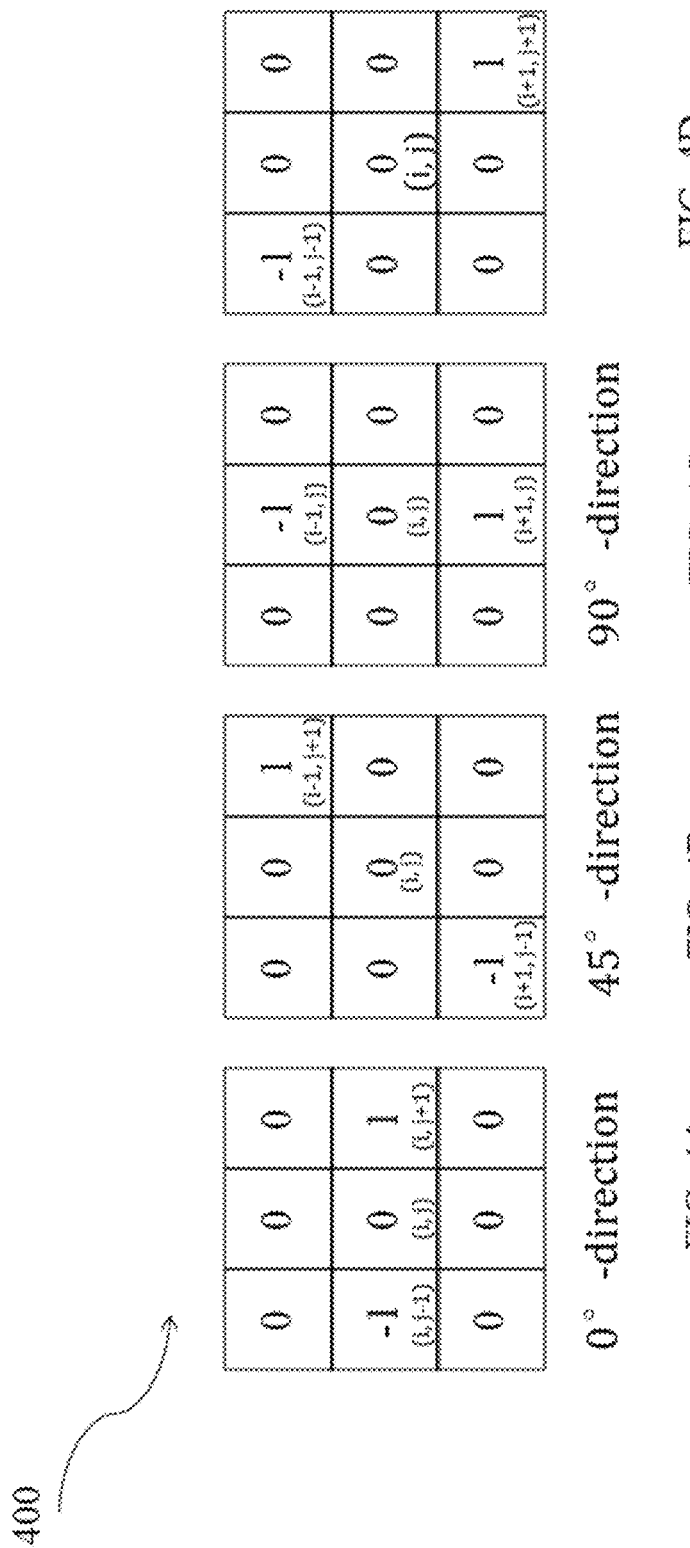
FIGS. 4A-4D illustrate an example 3×3 pixel matrix template to establish gradient values according to certain aspects of the disclosure.

FIG. 4A illustrates an example 3×3 pixel matrix template to establish gradient value $T_h$ in 0° direction as: $T_h(i,j)=|I(i,j-1)-I(i,j+1)|$.

FIG. 4B illustrates an example 3×3 pixel matrix template to establish gradient value gradient value $T_l$ in 45° direction as: $T_l(i,j)=|I(i+1,j-1)-I(i-1,j+1)|$.

FIG. 4C illustrates an example 3×3 pixel matrix template to establish gradient value $T_v$ in 90° direction as: $T_v(i,j)=|I(i+1,j)-I(i-1,j)|$.

FIG. 4D illustrates an example 3×3 pixel matrix template to establish gradient value $T_r$ in 135° direction as: $T_r(i,j)=|I(i+1,j+1)-I(i-1,j-1)|$.

The sum of $T_h(i,j), T_l(i,j), T_v(i,j)$, and $T_r(i,j)$ produces the greyscale gradient T(i,j) of the pixel (i,j).

Figure 5:
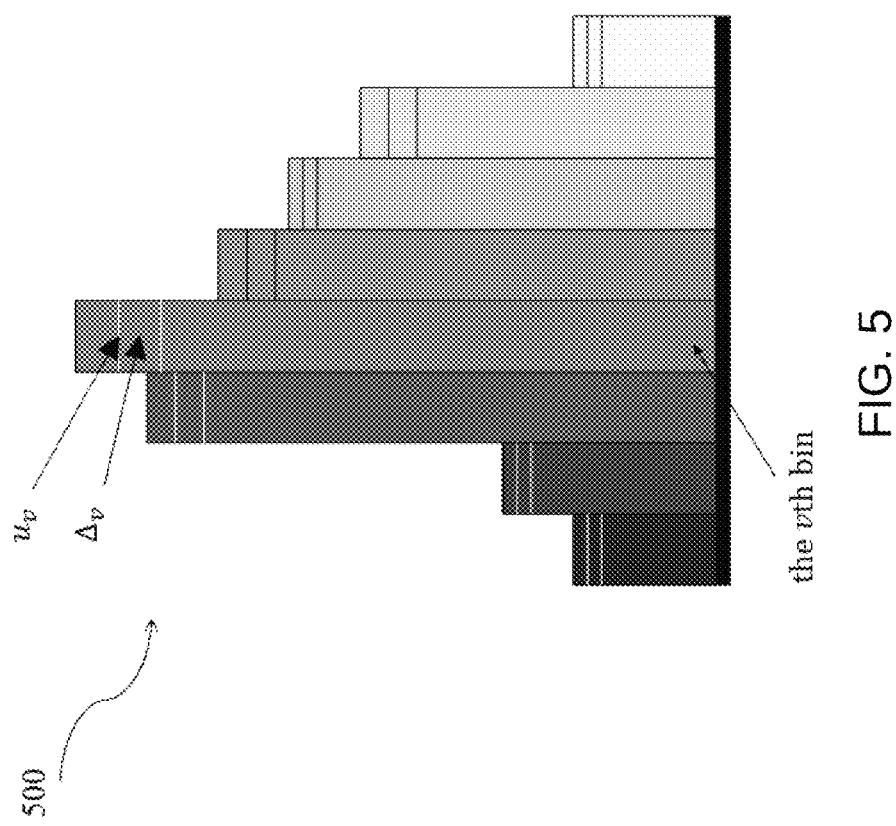
FIG. 5 illustrates a second-order weighted greyscale gradient histogram of a panoramic image according to certain aspects of the disclosure.

FIG. 5 illustrates a second-order weighted greyscale gradient histogram of a panoramic image according to certain aspects of the disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

The greyscale gradient of each pixel in the panoramic image may be produced to according to FIGS. 4A-4D to construct a greyscale gradient space. To establish a weighted histogram of greyscale gradient T(i,j) of the pixel (i,j), the greyscale gradient space may be divided into a number of bins. The number of bins can be any positive integer m. The density probability of greyscale gradient in the with (v=1, 2 ... m) bin may be defined as:

$$\hat{q}_v = C \sum_{i=1}^{n_b} g\left(\left\|\left(\frac{x-x_i}{h}\right)^2\right\|\right) \delta[b(x_i) - v],$$

where $$C = \frac{1}{\sum_{i=1}^{n_b} g\left(\left\|\frac{x-x_i}{h}\right\|^2\right)}$$

is a normalizing constant $$g\left(\left\|\frac{x-x_i}{h}\right\|^2\right)$$

may be any kernel function, including but not limited to Epanechnikov function, uniform function, normal function, box filter, and/or Gaussian function as described with reference to block 306 in FIG. 3. h is the window size. In some aspects, the window size may be fixed in the automatic tracking process of the present disclosure. In some aspects, the size of window may be self-adaptive in the automatic tracking process of the present disclosure, which enhances the accuracy and efficiency of the automatic tracking process.

The weighted histogram of greyscale gradient T(i,j) of the pixel (i,j) may be combined with greyscale gradient space mean vector $u_v$ and a covariance matrix $\Delta_v$ to produce a histogram of second-order weighted greyscale gradient. In particular, mean vector $u_v$ may be defined as:

$$u_v = \frac{1}{\sum_{i=1}^{n_b} \delta[b(x_i) - v]} \sum_{i=1}^{n_b} (x_i - x_0) \delta[b(x_i) - v].$$

Covariance matrix $\Delta_v$ may be defined as:

$$\Delta_v = \frac{1}{\sum_{i=1}^{n_b} \delta[b(x_i) - v]} \sum_{i=1}^{n_b} (x_i - u_v)^T (x_i - u_v) \delta[b(x_i) - v].$$

Figure 6:
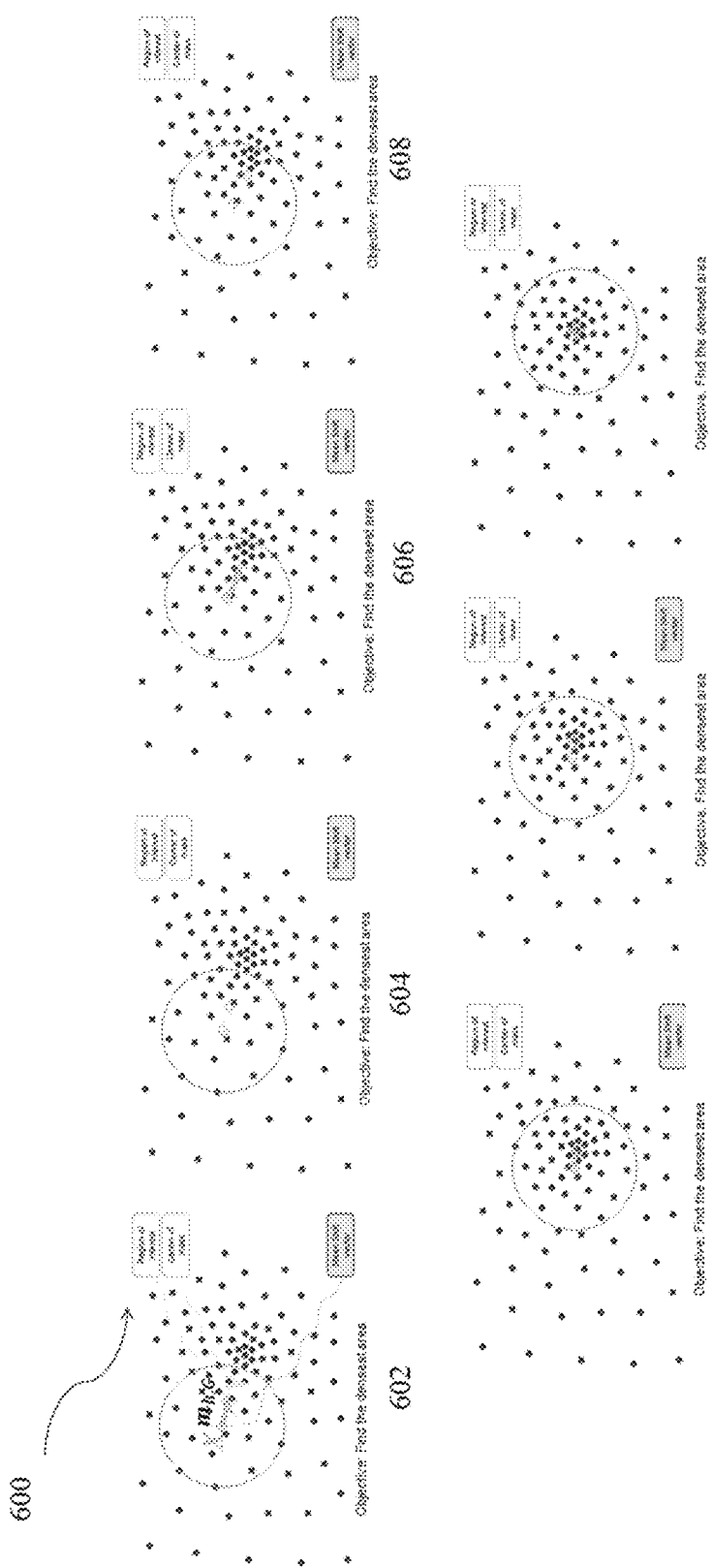
FIG. 6 illustrates a flow diagram of an example process 600 for automatic tracking of moving objects in panoramic video stream or image sequence according to one embodiment of the present disclosure.

FIG. 6 illustrates a flow diagram of an example process 600 for automatic tracking of moving objects in panoramic video stream or image sequence according to one embodiment of the present disclosure. For explanatory purposes, the example process 600 is primarily described herein with reference to panoramic imaging system 100 of FIG. 2; however, the example process 600 is not limited to the panoramic imaging system 100 of FIG. 2, and the example process 600 may be performed by one or more components of network environment 200 of FIG. 2, such as servers 210 and/or 220. Further for explanatory purposes, the blocks of the example process 600 are described herein as occurring in serial, or linearly. However, multiple blocks of the example process 600 may occur in parallel. In addition, the blocks of the example process 600 may be performed a different order than the order shown and/or one or more of the blocks of the example process 600 may not be performed.

Example process 600 may utilize a mean-shift algorithm. The mean-shift algorithm may implement a combined (e.g., non-parametric) feature space analysis for locating the maxima of a density function. Features in the combined feature space analysis may include color and/or greyscale gradient, including for example, a histogram of second-order weighted greyscale gradient described above with reference to FIG. 5. However, features in the combined feature space analysis are combined are not limited to color and greyscale gradient. Features that are combined can be any number of features including but not limited to, for example, color, greyscale gradient, intensity, edge.

As block 602, the example process 600 starts at an initial-guess point X as the mean. Re-estimation of the mean is done by averaging nearby points weighted by a kernel function $$g\left(\left\|\frac{x-x_i}{h}\right\|^2\right).$$

For explanatory purpose, the kernel function $$g\left(\left\|\frac{x-x_i}{h}\right\|^2\right)$$

refers to Gaussian function as described with reference to block 306 in FIG. 3. However, the kernel function is not limited to Gaussian function. The kernel function may be but not limited to Epanechnikov function, uniform function, normal function and box filter. After re-estimate of the mean, a mean-shift vector is established. Mean-shift vector is a vector pointing along the direction of probability density gradient at the current estimate, and measuring the difference between the present estimate X and the next Y:

$$m_{h,G}(x) = \underbrace{\frac{\sum_{i=1}^{n} x_i g\left(\left\|\frac{x-x_i}{h}\right\|^2\right)}{\sum_{i=1}^{n} g\left(\left\|\frac{x-x_i}{h}\right\|^2\right)}}_{m_h(x)} - x$$

The mean-shift algorithm may be performed in an iterative way as illustrated in blocks 602-612. At block 614, the algorithm is completed when the mean shift reach convergence, that is, the difference the present and the next estimate is less than a pre-defined threshold value $\epsilon$, $\|m_h(x)-x\|<\epsilon$.

By using example process 600, moving objects in a panoramic image, such as foreground objects 314 described in FIG. 3 may be automatically tracked.

Figure 7:
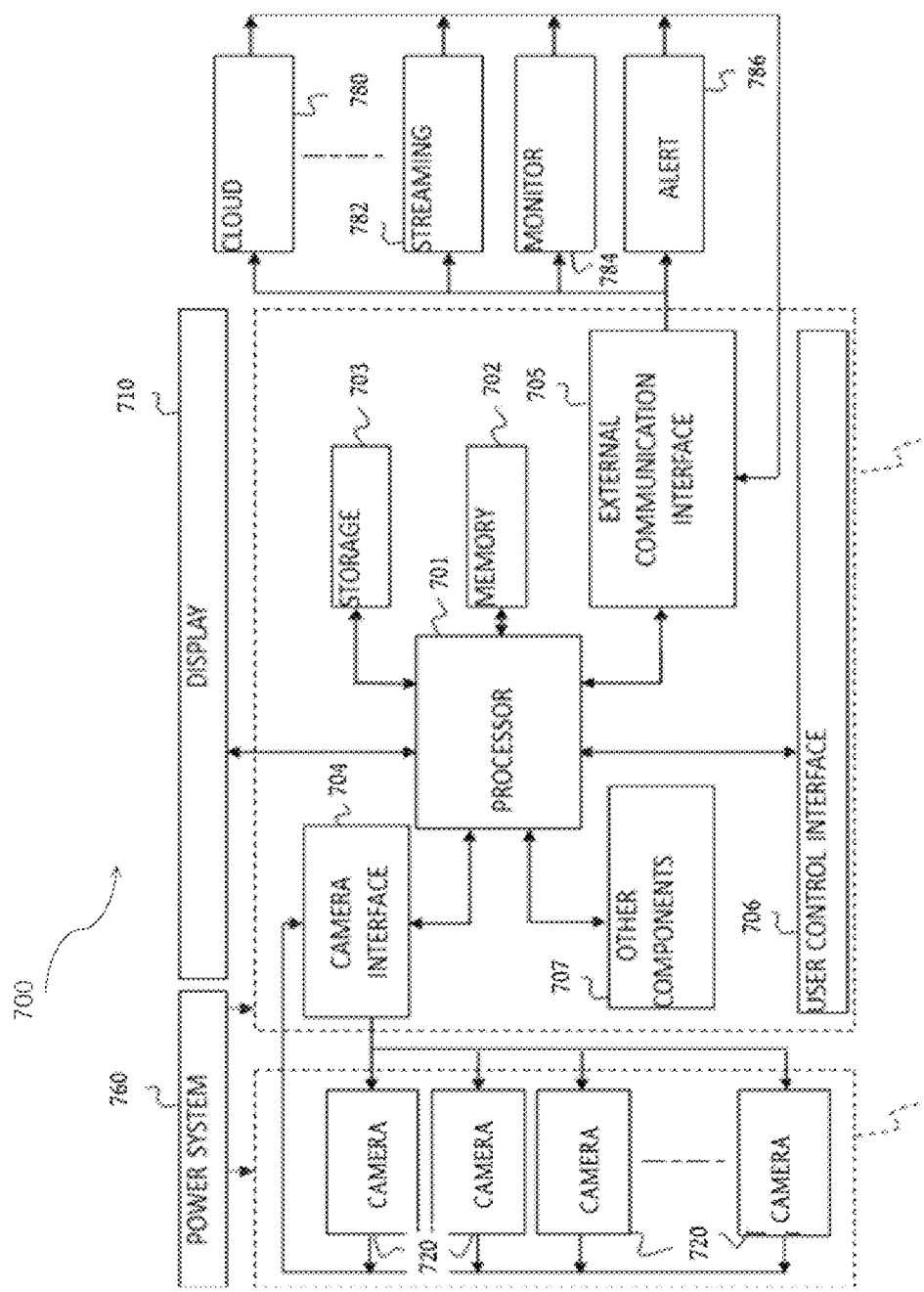
FIG. 7 conceptually illustrates an example electronic system with which some implementations of the subject technology can be implemented.

FIG. 7 conceptually illustrates an example electronic system 700 with which some implementations of the subject technology can be implemented. Not all of the depicted components may be used, however, and one or more implementations may include additional components not shown in the figure. Variations in the arrangement and type of the components may be made without departing from the scope of the subject technology. Additional components, different components, or fewer components may be provided.

The example electronic system 700 may include an example panoramic imaging system, such as panoramic imaging system 100 as described above with reference to FIG. 1. According to the present disclosure, the example panoramic imaging system includes a control system that controls the functions of the optical system 722 and at least an image processing algorithm. Particularly, the control system 740 includes at least a processor 701, a memory 702, a storage device 703, a camera interface 704, an external communication interface 705, and a user control interface 706. The control system 740 can be a general-purpose computer system such as a Personal Computer (PC), or preferably a custom-designed computing system. Particularly in some embodiments, the control system 740 is a system on chip (SOC); that is, an integrated circuit (IC) integrates all components and functions of the control system 740 into a single chip, which makes the present panoramic imaging system portable and electronically durable as a mobile device. In some embodiments, the control system 740 may be located internally within a same housing where the optical system 722 is located. Alternatively, in other embodiments, the control system 740 is separated from the optical system 722 to allow end users' selection of different models of an optical system 722 to be used with the control system 740.

The storage device 703 is preloaded with at least the image processing algorithm of the present disclosure. Other customer-designed software programs may be preloaded during manufacture or downloaded by end users after they purchase the system. Exemplary customer-designed software programs to be used with the present panoramic imaging system include but are not limited to software that further processes panoramic images or videos according to an end user's needs, such as 3D modeling, object tracking, and virtual reality programs. Further exemplary customer-designed software includes but is not limited to image editing programs that allow users to adjust color, illumination, contrast or other effects in a panoramic image, or film editing programs that allow users to select favorite views from a panoramic video to make normal videos.

The electronic circuitry in the processor 701 carries out instructions of the various algorithms. Thus, the various software programs, stored on the storage device 703 and executed in the memory 702 by the processor 701, direct the control system 740 to act in concert with the optical system 722 to perform various functions, which include but are not limited to receiving commands from an end user or an external device or service 701, defining the precise geometry of the cameras 720, commanding the cameras 720 to capture raw image data, tagging and storing raw data in a local storage device 703 and/or commuting raw data to an external device or service 701, processing raw data to create panoramic images or videos according to commands received, presenting generated panoramas on a local display 710 and/or communicating generated panoramas to be stored or presented on an external device or service 780, 782, 784 and 786.

The processor 701 of the present disclosure can be any integrated circuit (IC) that is designed to execute instructions by performing arithmetic, logical, control and input/output (I/O) operations specified by algorithms. Particularly, the processor can be a central processing unit (CPU) and preferably a microprocessor that is contained on a single IC chip. In some embodiments, the control system 740 may employ a multi-core processor that has two or more CPUs or array processors that have multiple processors operating in parallel. In some embodiments, the processor 701 is an application specific integrated circuit (ASIC) that is designed for a particular use rather than for general purpose use. Particularly, in some embodiments, the processor 701 is a digital signal processor (DSP) designed for digital signal processing. More particularly, in some embodiments, the processor 701 is an on-chip image processor, specialized for image processing in a portable camera system. In some embodiments, the control system 740 includes a graphic processing unit (GPU), which has a massively parallel architecture consisting of thousands of smaller, more efficient cores designed for handling multiple tasks simultaneously. Particularly, in some embodiments, the control system 740 may implement GPU-accelerated computing, which offloads compute-intensive portions of an algorithm to the GPU while keeping the remainder of the algorithm to run on the CPU.

The memory 702 and the storage 703 of the present disclosure can be any type of primary or secondary memory device compatible with the industry standard, such as read-only memory (ROM), random access memory (RAM), electrically erasable programmable read-only memory (EEPROM), and flash memory. In the embodiments where the control system 740 is a single chip system, the memory 702 and storage 703 blocks are also integrated on-chip with the processor 701 as well as other peripherals and interfaces. In some embodiments, the on-chip memory components may be extended by having one or more external solid-state storage media, such a secure digital (SD) memory card or a USB flash drive, reversibly connected to the imaging system. For example, the various memory units include instructions for removing an obstructing object in a panoramic image. From these various memory units, the processor 701 retrieves instructions to execute and data to process in order to execute the processes of some implementations.

The camera interface 704 of the present disclosure can be any form of command and data interface usable with a camera 720, such as a digital camera. Exemplary embodiments include USB, FireWire and any other interface for command and data transfer that may be commercially available. Additionally, it is preferred, although not required, that the optical system 722 be equipped with a single digital control line that would allow a single digital signal to command all the cameras 720 simultaneously to capture an image of a scene.

The external communication interface 705 of the present disclosure can be any data communication interface, and may employ a wired, fiber-optic, wireless, or another method for connection with an external device or service 780, 782, 784 and 786. Ethernet, wireless-Ethernet, Bluetooth, USB, FireWire, USART, SPI are exemplary industry standards. In some embodiments, where the control system 740 is a single chip system, the external communication interface 705 is integrated on-chip with the processor 701 as well as other peripherals and interfaces.

The user control interface 706 of the present disclosure can be any design or mode that allows effective control and operation of the panoramic imaging system from the user end, while the system feeds back information that aids the user's decision making process. Exemplary embodiments include but are not limited to graphical user interfaces that allow users to operate the system through direct manipulation of graphical icons and visual indicators on a control panel or a screen, touchscreens that accept users' input by touch of fingers or a stylus, voice interfaces which accept users' input as verbal commands and outputs via generating voice prompts, gestural control, or a combination of the aforementioned modes of interface.

The control system 740 of the present disclosure may further include other components that facilitate its function. For example, the control system 740 may optionally include a location and orientation sensor that could determine the location and orientation of the panoramic imaging system. Exemplary embodiments include a global positioning system (GPS) that can be used to record geographic positions where image data are taken, and a digital magnetic compass system that can determine the orientation of camera system in relation to the magnetic north. The control system 740 may optionally be equipped with a timing source, such as an oscillator or a phase-locked loop, which can be used to schedule automatic image capture, to time stamp image data, and to synchronize actions of multiple cameras to capture near simultaneous images in order to reduce error in image processing. The control system 740 may optionally be equipped with a light sensor for environmental light conditions, so that the control system 740 can automatically adjust hardware and/or software parameters of the system.

In some embodiments, the present panoramic imaging system is further equipped with an internal power system 760 such as a battery or solar panel that supplies the electrical power. In other embodiments, the panoramic imaging system is supported by an external power source. In some embodiments, the panoramic imaging system is further equipped with a display 710, such that panoramic photos may be presented to a user instantly after image capture, and panoramic videos may be displayed to a user in real time as the scenes are being filmed.

In some embodiments, the present panoramic imaging system may be used in conjunction with an external device for displaying and/or editing panoramas generated. Particularly, the external device can be any electronic device with a display and loaded with software or applications for displaying and editing panoramic images and videos created by the present system. In some embodiments, the external device can be smart phones, tablets, laptops or other devices programmed to receive, display, edit and/or transfer the panoramic images and videos. In some embodiments, the present panoramic imaging system may be used in conjunction with an external service, such as Cloud computing and storage 780, online video streaming 782 and file sharing 782, remote surveillance 784, and alert 786 for home and public security.

The exemplary embodiments set forth above are provided to give those of ordinary skill in the art a complete disclosure and description of how to make and use the embodiments of the devices, systems and methods of the disclosure, and are not intended to limit the scope of what the inventors regard as their disclosure. Modifications of the above-described modes for carrying out the disclosure that are obvious to persons of skill in the art are intended to be within the scope of the following claims. All patents and publications mentioned in the disclosure are indicative of the levels of skill of those skilled in the art to which the disclosure pertains. All references cited in this disclosure are incorporated by reference to the same extent as if each reference had been incorporated by reference in its entirety individually.

The entire disclosure of each document cited (including patents, patent applications, journal articles, abstracts, laboratory manuals, books, or other disclosures) is hereby incorporated herein by reference.

It is to be understood that the disclosures are not limited to particular compositions or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

While this patent document contains many specifics, these should not be construed as limitations on the scope of any invention or of what may be claimed, but rather as descriptions of features that may be specific to particular embodiments of particular inventions. Certain features that are described in this patent document and attached appendix in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document and attached appendix should not be understood as requiring such separation in all embodiments.

Only a few implementations and examples are described and other implementations, enhancements and variations can be made based on what is described and illustrated in this patent document.

What is claimed is:

1. A method of automatic detecting and tracking of a foreground object, the method comprising:
   receiving a first set of raw images in an image sequence captured by a panoramic imaging system;
   stitching, by the panoramic imaging system, the first set of raw images to generate a panoramic image;
   detecting, by the panoramic imaging system, a foreground object in the panoramic image;
   tracking, by the panoramic imaging system, a movement of the foreground object in the image sequence; and
   generating, by the panoramic imaging system, a panoramic video based on the image sequence with tracking the movement of the foreground object, wherein the tracking the movement of the foreground object in the image sequence comprises: starting from a position of the detected foreground object in a first panoramic image in the image sequence; searching in the neighborhood of the detected foreground object in a second panoramic image in the image sequence; identifying a plurality of candidate target foreground objects; and determining a best target foreground object candidate.

2. The method of claim 1, wherein the panoramic imaging system includes a plurality of cameras and the raw images include overlapping images captured concurrently by the plurality of cameras.

3. The method of claim 1, wherein the stitching the first set of raw images to generate a panoramic image comprises:
 analyzing each pair of raw images having an overlapping field to identify an optimum line; and
 cutting and stitching the pair of raw images along the optimum line, wherein the optimum line makes the total error introduced by cutting and stitching the pair of raw images along the optimum line to be the minimum.

4. The method of claim 1, wherein the detecting the foreground object in the panoramic image comprises performing a background modeling to detect a foreground pixel group in the panoramic image.

5. The method of claim 1, the tracking the movement of the foreground object in the image sequence is performed by a mean-shift algorithm implemented with a combined feature space analysis with a histogram of second-order weighted greyscale gradient.

6. The method of claim 5, wherein the histogram of second-order weighted greyscale gradient includes a weighted histogram of greyscale gradient, a greyscale gradient space mean vector, and a covariance matrix.

7. A panoramic imaging system, comprising:
 a plurality of cameras having a field of view that overlaps with the field of view of at least one other camera among the plurality of cameras;
 a controller commanding a first camera and a second camera among the plurality of cameras to acquire a first image and a second image, respectively; and
 a processor performing operations comprising:
  receiving the first image and the second image in an image sequence;
  stitching the first image and the second image to generate a panoramic image;
  detecting a foreground object in the panoramic image;
  tracking a movement of the foreground object in the image sequence; and
  generating a panoramic video based on the image sequence with tracking the movement of the foreground object, wherein the operations of the tracking the movement of the foreground object in the image sequence comprises: starting from a position of the detected foreground object in a first panoramic image in the image sequence; searching in the neighborhood of the detected foreground object in a second panoramic image in the image sequence; identifying a plurality of candidate target foreground objects; and
  determining a best target foreground object candidate.

8. The panoramic imaging system of claim 7, wherein the operations of stitching the first image and the second image to generate a panoramic image comprises:
 analyzing the first image and the second image to identify an optimum line; and
 cutting and stitching the first image and the second image along the optimum line, wherein the optimum line makes the total error introduced by cutting and stitching the first image and the second image along the optimum line to be the minimum.

9. The panoramic imaging system of claim 7, wherein the operations of detecting the foreground object in the panoramic image comprises performing a background modeling to detect a foreground pixel group in the panoramic image.

10. The panoramic imaging system of claim 7, wherein the operations of the tracking the movement of the foreground object in the image sequence is performed by a mean-shift algorithm implemented with a combined feature space analysis with a histogram of second-order weighted greyscale gradient.

11. The panoramic imaging system of claim 7, wherein the histogram of second-order weighted greyscale gradient includes a weighted histogram of greyscale gradient, a greyscale gradient space mean vector, and a covariance matrix.

* * * * *